L. HOMANN.
STRIPING-TOOLS FOR PAINTS.

No. 194,912. Patented Sept. 4, 1877.

Attest
Chas. F. Gessert
James Moore.

Inventor
Louis Homann
By Geo. J. Murray
his Attorney

UNITED STATES PATENT OFFICE.

LOUIS HOMANN, OF CINCINNATI, OHIO.

IMPROVEMENT IN STRIPING-TOOLS FOR PAINTS.

Specification forming part of Letters Patent No. 194,912, dated September 4, 1877; application filed February 24, 1877.

*To all whom it may concern:*

Be it known that I, LOUIS HOMANN, of Cincinnati, in the county of Hamilton and State of Ohio, have invented a new and useful Improvement in Striping-Tools, which improvement is fully set forth in the following specification and accompanying drawings, in which—

Figure 1:
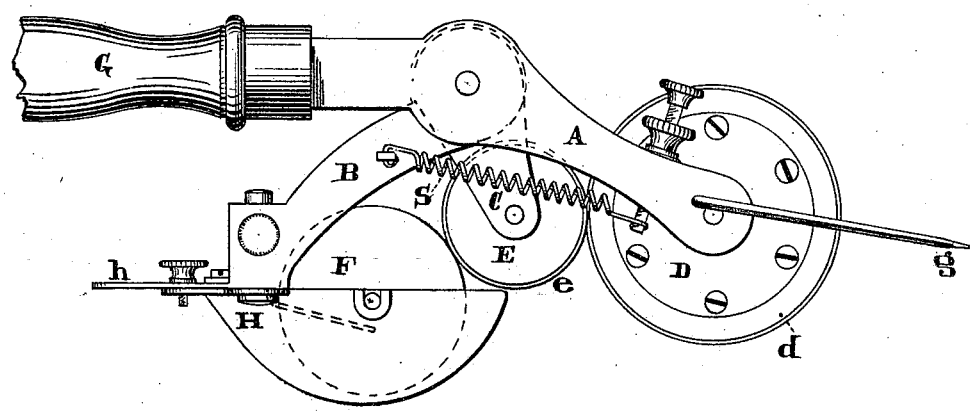
Figure 2:
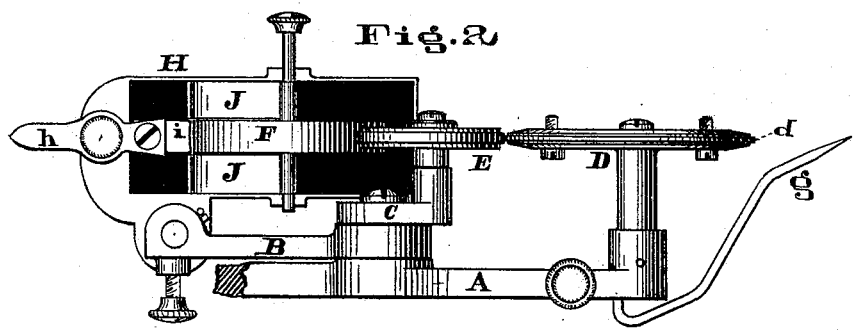
Figure 3:
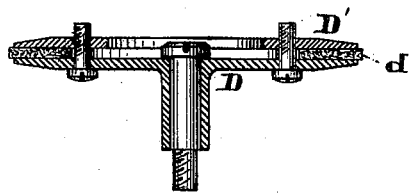

Figure 1 is a side elevation; Fig. 2, a plan view of the tool looking from the top; and Fig. 3, a transverse section of the marking-wheel.

The object of this invention is provide a tool that will make a uniform, even stripe, of any desired width, or two or more parallel stripes at the same time, if desired, and which will carry a supply of color that will be kept thoroughly mixed by a distributing-wheel revolving in the reservoir, in connection with scrapers attached to the reservoir, and distributed evenly upon the marking-wheel by an intermediate wheel, the wheels being kept in contact when in use by a spring.

In the drawings, A is the stock, secured in handle G, which carries the marking-wheel D D' a, the arm C, to which is journaled the intermediate wheel E, and the arm B, which carries the color-reservoir H. F is a wheel, made preferably of hard rubber, and journaled in the sides of the reservoir. J J are scrapers, secured to the side of H, so as to come against the sides of wheel F and return the color which has been brought up on the sides of the wheel back into the reservoir. h is a gage, adjustably secured to the reservoir by a set-screw. It has clamped in its end nearest the wheel a piece of leather or rubber, i, for the purpose of regulating the supply of color distributed on band e of wheel E, and returning the surplus into the reservoir. The marking-wheel is composed of the wheel D and metal washer D' of the same diameter, and the rubber washer d of a larger diameter clamped between the parts D and D' by screws. s is a coiled spring, one end of which is secured to arm B, and the other to a set-screw passing through stock A. Its purpose is to keep all the wheels in contact when the tool is used. g is a pointer, secured to the forward end of stock A to enable the operator to more accurately follow any line or pattern drawn upon the surface to be striped.

The operation is as follows: A sufficient quantity of the color, properly mixed, is put into the reservoir H, and the tool is ready for use as soon as the wheel is revolved a few times to properly distribute the color on the marking-wheel. As it is used the wheel F, which nearly touches the bottom of the reservoir, carries up a considerable quantity of the color on its sides, which is returned again to the reservoir, thus keeping the color thoroughly mixed. The width of the stripe is regulated by the thickness of the rubber washer used, and if it is desired to make two stripes two rubbers are used, with a metal washer between them. The rubber washer, clamped between metal disks, will always secure an even stripe, while a rubber band stretched over a wheel will be liable, owing to the uneven texture of the rubber, to make a stripe of uneven width.

I claim—

1. In a striping-tool, the marking-wheel composed of rubber washer d clamped between the parts D D', which confine and support the rubber marker up to within close proximity of its marking-edge, substantially as shown and described.

2. The striping-tool composed of the described marking-wheel, the wheel F, revolving in the pivoted or swinging reservoir H, and intermediate wheel E, the said wheels being held in contact by spring s, and the whole operating in the manner and for the purpose specified.

LOUIS HOMANN.

Witnesses:
E. D. GRAFTON,
GEO. J. MURRAY.